US012794341B2

(12) United States Patent
Duan et al.

(10) Patent No.: US 12,794,341 B2
(45) Date of Patent: Nov. 10, 2026

(54) POWER CONVERTERS AND STAIRCASE MODULATION METHODS THEREFOR

(71) Applicant: Eaton Intelligent Power Limited, Dublin (IE)

(72) Inventors: Jiajie Duan, Shanghai (CN); Jianxiong Yu, Shanghai (CN); Cheng Wang, Changzhou (CN); Cheng Luo, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 151 days.

(21) Appl. No.: 18/909,226

(22) Filed: Oct. 8, 2024

(65) Prior Publication Data

US 2025/0125708 A1 Apr. 17, 2025

(30) Foreign Application Priority Data

Oct. 16, 2023 (CN) ........................ 202311338240.8

(51) Int. Cl.
*H02M 7/49* (2007.01)
*H02M 1/00* (2007.01)
(Continued)

(52) U.S. Cl.
CPC ..... *H02M 1/0043* (2021.05); *H02M 7/53871* (2013.01); *H02M 1/0054* (2021.05); *H02M 1/12* (2013.01)

(58) Field of Classification Search
CPC .. H02M 7/497; H02M 7/483; H02M 7/53871; H02M 7/42; H02M 1/0043;
(Continued)

(56) References Cited

U.S. PATENT DOCUMENTS 10,079,558 B2 * 9/2018 Flannery ............... H02J 3/1857
10,116,229 B1 * 10/2018 Alshammaa ............ H02M 7/49

OTHER PUBLICATIONS

Chunwei Song NPL "Multilevel Hybrid Frequency Modulation With Adaptive DC Link Voltage Fluctuation and Dead-Time Elimination for Cascaded H-Bridge Inverter" (Year: 2025).*

(Continued)

*Primary Examiner* — Sisay G Tiku
(74) *Attorney, Agent, or Firm* — Stanek Lemon Crouse & Meeks, PA

(57) ABSTRACT

A power converter and a staircase modulation method therefor are provided. The power converter includes n cascaded bridges, where n≥2, the n cascaded bridges are each configured to output same multilevel pulses, the output n multilevel pulses are sequentially phase-shifted by a same angle, and the n multilevel pulses are superposed on each other to form a desired output pulse waveform of the power converter. Each of the n cascaded bridges is configured such that an output pulse of each cascaded bridge includes 2k+1 sub-pulses in each half cycle, where k≥1; and the 2k+1 sub-pulses are symmetrically distributed by using a $(k+1)^{th}$ sub-pulse as a center, pulse widths from a $1^{st}$ sub-pulse to the $(k+1)^{th}$ sub-pulse sequentially increase, and pulse widths from the $(k+1)^{th}$ sub-pulse to a $(2k+1)^{th}$ sub-pulse sequentially decrease.

10 Claims, 5 Drawing Sheets

(51) Int. Cl.
*H02M 7/48* (2007.01)
*H02M 7/5387* (2007.01)
*H02M 1/12* (2006.01)

(58) Field of Classification Search
CPC .... H02M 1/0054; H02M 1/007; H02M 1/083; H02M 1/12
See application file for complete search history.

(56) References Cited

OTHER PUBLICATIONS

G. Mehlmann, G. Herold "The generation of symmetrical space phasors compared with the selective harmonic elimination method of multilevel converters" (Year: 2010).*
Alan Joseph "A 24-Pulse Rectifier Cascaded Multilevel Inverter With Minimum Number of Transformer Windings" (Year: 2005).*

* cited by examiner

POWER CONVERTERS AND STAIRCASE MODULATION METHODS THEREFOR

CROSS-REFERENCE TO PRIORITY APPLICATION

This application claims priority to Chinese Patent Application No. 202311338240.8, filed Oct. 16, 2023, the content of which is hereby incorporated herein by reference in its entirety.

TECHNICAL FIELD

The present inventive concept related generally to electric power supplies, and in particular, to a power converter and a staircase modulation method therefor.

BACKGROUND

In hyper-scale power supply applications, a medium-voltage (MV) solid-state transformer (SST) can implement a higher power density, higher efficiency, and a lower weight because it uses a smaller high-frequency transformer whose operating frequency exceeds 10 kHz to replace a traditional heavy 50/60-Hz transformer.

A modular topology structure is one of the best solutions to construct a medium-voltage solid-state transformer system. For a medium-voltage solid-state transformer, one of key points influencing its efficiency, dynamic performance, and power balance among all modules is modulation of a cascaded bridge. Those skilled in the art have been exploring a modulation method that can optimize switching losses, power balance, and dynamic performance of a cascaded bridge system.

SUMMARY

Therefore, the present inventive concept aims to overcome the foregoing disadvantages of the conventional technology, and provides a power converter, which includes n cascaded bridges, where n≥2. The n cascaded bridges are each configured to output same multilevel pulses, the output n multilevel pulses are sequentially phase-shifted by a same angle, and the n multilevel pulses are superposed on each other to form a desired output pulse waveform of the power converter.

Each of the n cascaded bridges is configured such that an output pulse of each cascaded bridge includes 2k+1 sub-pulses in each half cycle, where k≥1.

The 2k+1 sub-pulses are symmetrically distributed by using a $(k+1)^{th}$ sub-pulse as a center, pulse widths from a $1^{st}$ sub-pulse to the $(k+1)^{th}$ sub-pulse sequentially increase, and pulse widths from the $(k+1)^{th}$ sub-pulse to a $(2k+1)^{th}$ sub-pulse sequentially decrease.

According to the power converter of the present inventive concept, preferably, the multilevel pulses are 2-level pulses or 3-level pulses.

According to the power converter of the present inventive concept, preferably, the 2k+1 sub-pulses are spaced by 2k zero zones, and the 2k zero zones are symmetrically distributed by using the $(k+1)^{th}$ sub-pulse as a center.

According to the power converter of the present inventive concept, widths from a $1^{st}$ zero zone to a $k^{th}$ zero zone sequentially decrease, and widths from a $(k+1)^{th}$ zero zone to a $2k^{th}$ zero zone sequentially increase.

According to the power converter of the present inventive concept, a minimum value of the same angle is 1/n of the pulse width of the $1^{st}$ sub-pulse.

According to the power converter of the present inventive concept, n=10, for example.

According to the power converter of the present inventive concept, k=1, 2, or 3, for example.

The present inventive concept further provides a staircase modulation method for a power converter. The power converter includes n cascaded bridges, where n≥2, and the staircase modulation method includes: adjusting the n cascaded bridges such that the n cascaded bridges each output same multilevel pulses and the output n multilevel pulses are sequentially phase-shifted by a same angle, and superposing the n multilevel pulses on each other to form a desired output pulse waveform of the power converter, Each of the n cascaded bridges is adjusted such that an output pulse of each cascaded bridge includes 2k+1 sub-pulses in each half cycle, where k≥1.

The 2k+1 sub-pulses are symmetrically distributed by using a $(k+1)^{th}$ sub-pulse as a center, pulse widths from a $1^{st}$ sub-pulse to the $(k+1)^{th}$ sub-pulse sequentially increase, and pulse widths from the $(k+1)^{th}$ sub-pulse to a $(2k+1)^{th}$ sub-pulse sequentially decrease.

According to the staircase modulation method of the present inventive concept, preferably, the n cascaded bridges are adjusted such that the n cascaded bridges each output 2-level pulses or 3-level pulses.

According to the staircase modulation method of the present inventive concept, preferably, each of the n cascaded bridges is further adjusted such that the 2k+1 sub-pulses are spaced by 2k zero zones, and the 2k zero zones are symmetrically distributed by using the $(k+1)^{th}$ sub-pulse as a center.

Compared with the conventional technology, the multi-level power converter in the present inventive concept has low power imbalance, reduced harmonics, low switching losses, and good dynamic performance.

BRIEF DESCRIPTION OF THE DRAWINGS

The following further describes the embodiments of the present inventive concept with reference to the accompanying drawings, where.

DETAILED DESCRIPTION

To make the objectives, technical solutions, and advantages of the present inventive concept clearer, the following further describes the present inventive concept in detail through the embodiments with of the reference to the accompanying drawings. It should be understood that the embodiments described herein are only used to explain the present inventive concept, but not intended to limit the present inventive concept.

Figure 1:
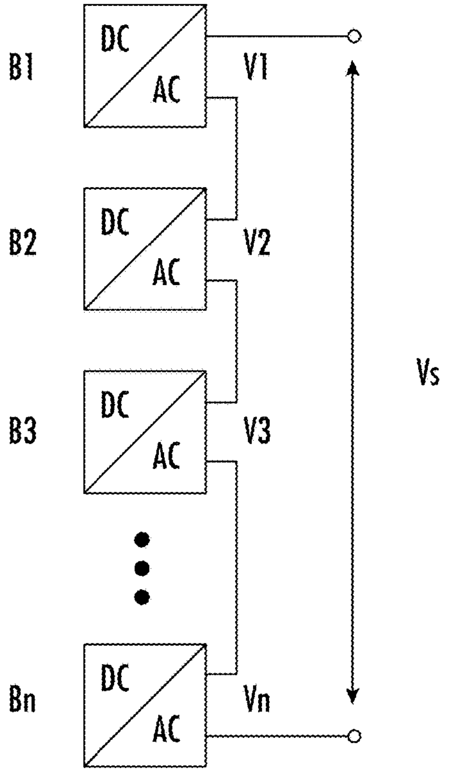
FIG. 1 is a circuit topology of a cascaded bridge-based multilevel converter according to some embodiments of the present inventive concept.

FIG. 1 shows a circuit topology of a cascaded bridge-based multilevel converter according to some embodiments of the present inventive concept. The circuit topology includes a plurality of DC/AC bridges B1, B2, B3, . . . , and Bn. Alternating current outputs V1, V2, V3, . . . , and Vn of the DC/AC bridges are connected in series. Therefore, all the DC/AC bridges are cascaded to generate a relatively high alternating current output voltage Vs=V1+V2+V3+ . . . +Vn. Because each bridge can generate three levels of voltages (+V, 0, −V) on its alternating current side, a total alternating current output voltage Vs of the entire system may be 2n+1 levels (−nV, . . . , 0, . . . , +nV).

Figure 2:
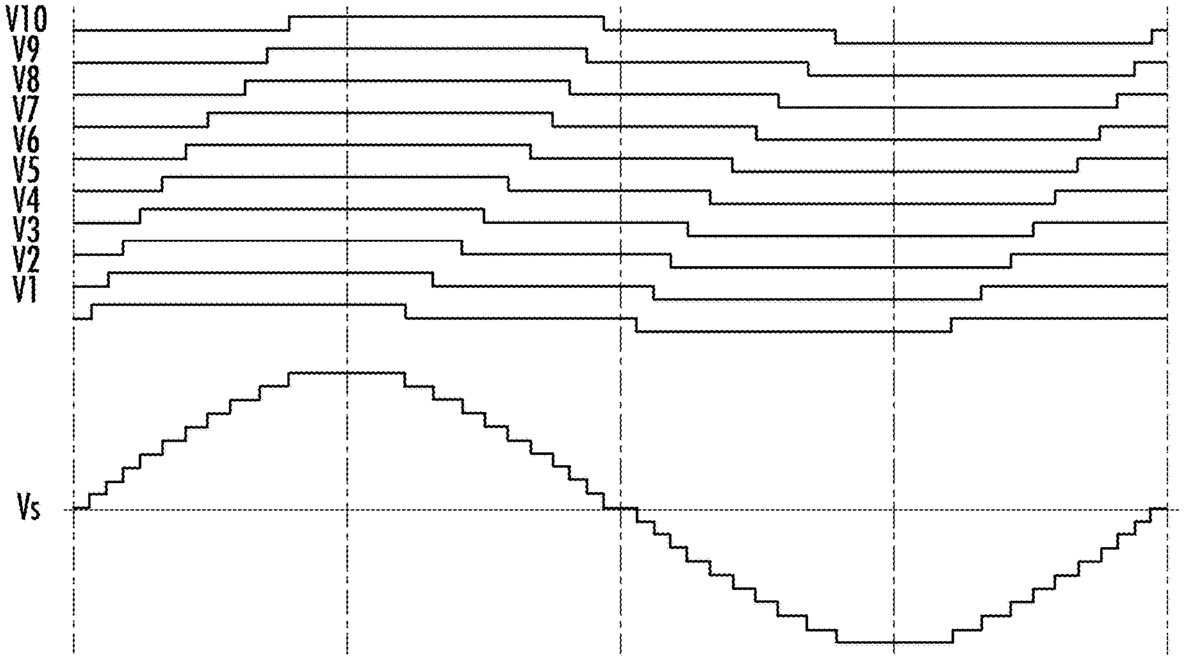
FIG. 2 shows a conventional method of generating a staircase waveform of one cycle by performing phase shifting on AC voltages of 10 cascaded bridges.
Figure 3:
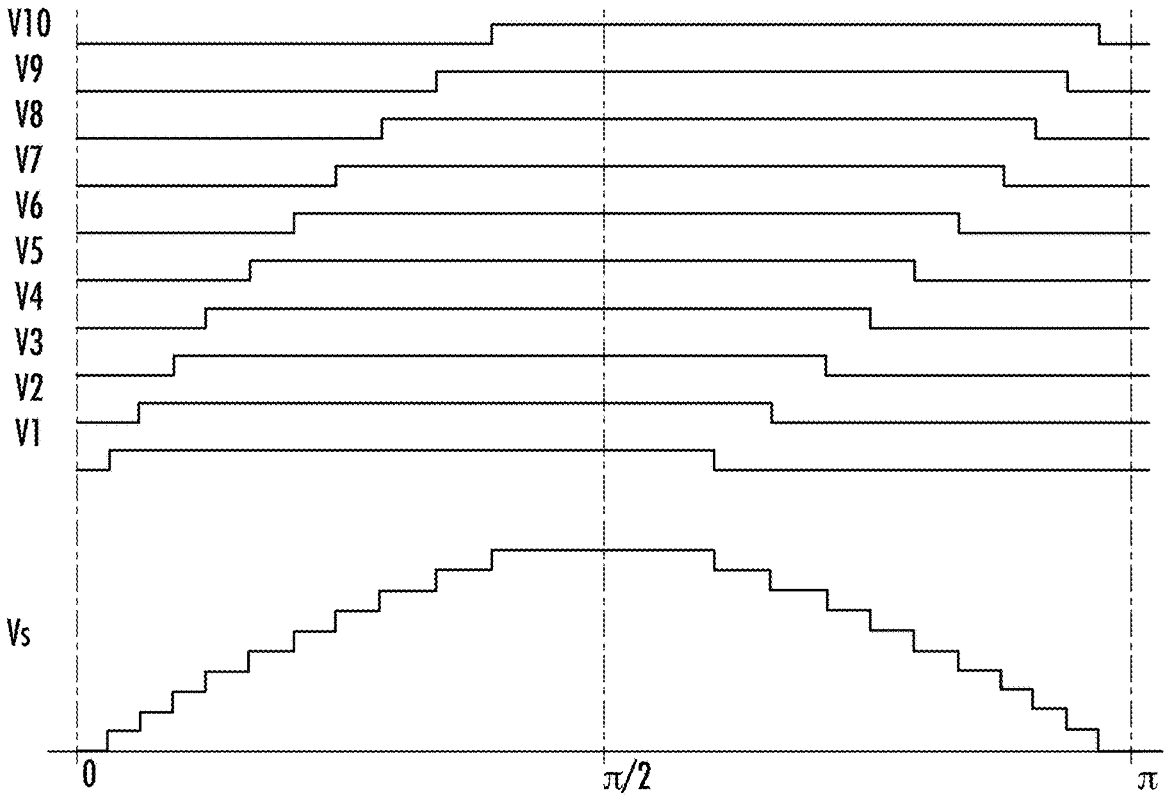
FIG. 3 is an enlarged view of a half cycle of the staircase waveform in FIG. 2.

10 cascaded bridges are used as an example. FIG. 2 shows a conventional method of generating a staircase waveform of one cycle by performing phase shifting on AC voltages of the 10 cascaded bridges. Output voltages V1, V2, . . . , and V10 of the $1^{st}$ to the $10^{th}$ cascaded bridges are three levels of voltages +V, 0, and −V varying periodically, and the output voltages of the 10 cascaded bridges are superposed on each other to generate a staircase waveform Vs. For clarity, FIG. 3 shows an enlarged view of a half cycle of the staircase waveform in FIG. 2, and it may be learned that sine modulation of the total voltage is implemented through phase shifting and small differences between pulse widths, wherein the phase shifting is a main factor. Specifically, phases of V1 to V10 lag sequentially, and (PW5=PW6)>(PW4=PW7)>(PW3=PW8)>(PW2=PW9)>(PW1=PW10), where PW1~PW10 respectively represent pulse widths of the alternating current output voltages V1, V2, . . . , and V10 of the $1^{st}$ to the $10^{th}$ cascaded bridges. In this embodiment, if a sine (cosine) voltage waveform is to be output as a whole, a phase shift of the $10^{th}$ cascaded bridge is the maximum and may be close to 90 degrees, and phase shifts of the other cascaded bridges are evenly distributed from 0 degrees to the maximum phase shift angle. Those skilled in the art can understand that for a determined maximum phase shift angle, if a quantity n of cascaded bridges is different, angles at which the bridges are sequentially phase-shifted are also different.

However, this method has an obvious disadvantage, that is, considering an alternating current with the same phase angle as the total voltage (power factor=1), since the voltage of each bridge has a different phase angle with respect to the alternating current, power factors of all the bridges are different, which results in significant imbalance of power allocation of a cascaded system, and a pulse width difference makes power imbalance of each bridge worse. Therefore, embodiments of the present inventive concept aim to optimize phase shift angles and pulse width differences between the bridges, thereby improving power imbalance of the cascaded system and reducing harmonics.

Figure 4:
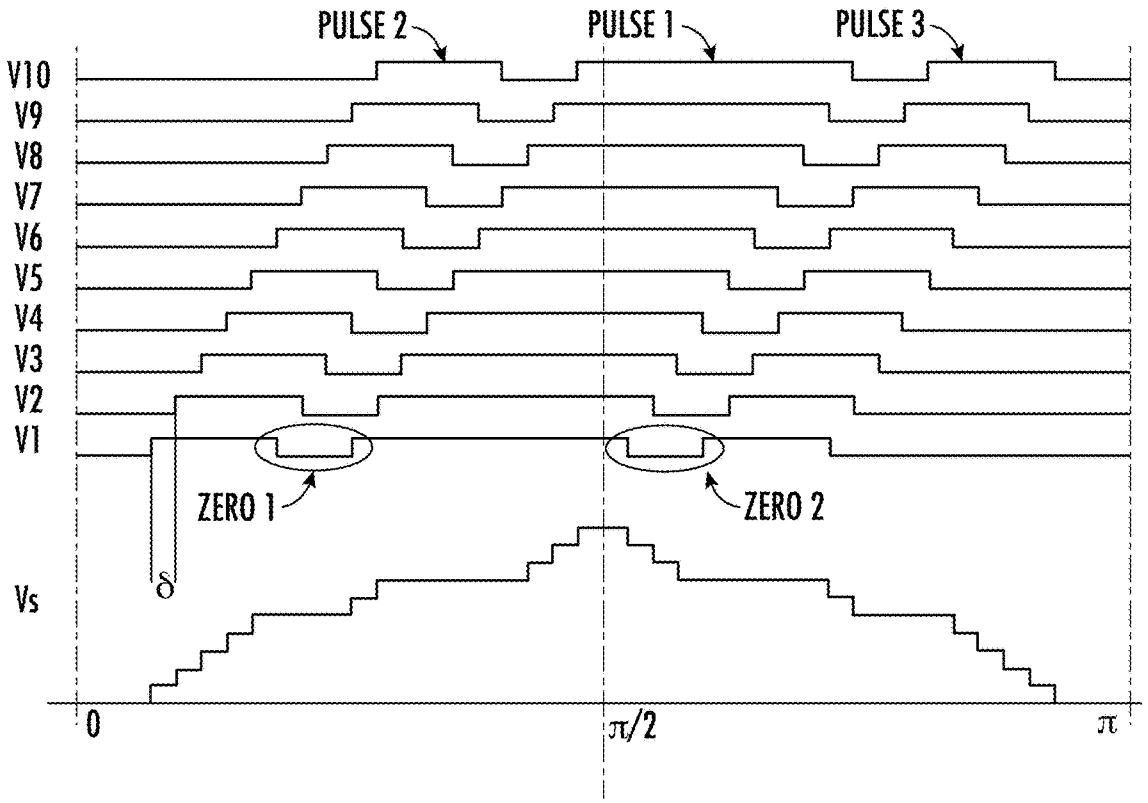
FIG. 4 is waveform diagrams of an output voltage of each cascaded bridge and a total output voltage of the cascaded bridges according to some embodiments of the present inventive concept.

Some embodiments of the present inventive concept provides a staircase modulation method for a power converter. FIG. 4 shows waveform diagrams of an output voltage of each cascaded bridge and a total output voltage of the cascaded bridges according to this embodiment. Compared with output voltage pulses of the cascaded bridges shown in FIG. 3, in this embodiment, the output voltage pulses of the cascaded bridges shown in FIG. 3 are first set to the same width, and then two "zero zones" (a "zero zone pair") Zero1 and Zero2 are inserted into each voltage pulse to divide one voltage pulse into three pulses Pulse1, Pulse2 and Pulse3 (thus, these embodiments may also be referred to as a "three-pulse embodiment"). An interval between the pulse Pulse1 and the pulse Pulse2 is Zero1, and an interval between the pulse Pulse1 and the pulse Pulse3 is Zero2. In this embodiment, the width of the pulse Pulse1 is greater than the width of the pulse Pulse2 on the left side of the pulse Pulse1 and the width of the pulse Pulse3 on the right side of the pulse Pulse1. In addition, the width of the pulse Pulse2 and the width of the pulse Pulse3 are equal, and the widths of Zero1 and Zero2 are equal. Therefore, an "up stairs" configuration is formed from the pulse Pulse2 to the pulse Pulse1, a "down stairs" configuration is formed from the pulse Pulse1 to the pulse Pulse3, and the pulse Pulse2 and the pulse Pulse3 are symmetrically arranged with respect to the pulse Pulse1, forming a half-wave waveform that is symmetrical about a π/2 line. In addition, as shown in FIG. 4, the two zero zones have same distances from the midpoint of an initial pulse. If the distances are not equal, additional harmonics will be introduced. In particular, the widths and positions (that is, the distances between the zero zones and the midpoint of the initial pulse) of the zero zones are calculated based on harmonics to be filtered, and the sum of the three voltage pulses of each cascaded bridge is modulated closer to a sine wave. According to these embodiments of the present inventive concept, the more pulses, the closer the whole is to a sine wave.

In this embodiment, a phase shift δ of adjacent bridges may be obtained by equally dividing a half of the shortest pulse width into n (n=10 in this embodiment) parts, and the phase shift angle is a minimum value at which output voltages of n cascaded bridges can be superposed to n levels, and is smaller than a phase shift of adjacent bridges in a conventional modulation method. These embodiments are used as an example, and the minimum phase shift angle δ is one tenth of the pulse width of the pulse Pulse3. A larger quantity of pulses results in a narrower shortest pulse, and therefore, a phase shift angle obtained after equal division is smaller. In addition, according to the method in this embodiment, a phase shift may be decoupled from sine modulation of the total voltage. In the conventional method shown in FIG. 2, to achieve a total voltage in a sine form, the phase shift angle and pulse width of each cascaded bridge need to vary according to a rule of a sine curve. In the method in this embodiment, a quantity and a shape of pulse of each cascaded bridge are the same, and a sine rule is already embodied in these waveforms. Phase shifting is mainly used to reduce a voltage change rate dv/dt. The phase shifts between the cascaded bridges can vary linearly to facilitate power balancing. A smaller phase shift angle means reduced imbalance of power allocation in a cascaded system.

Figure 5:
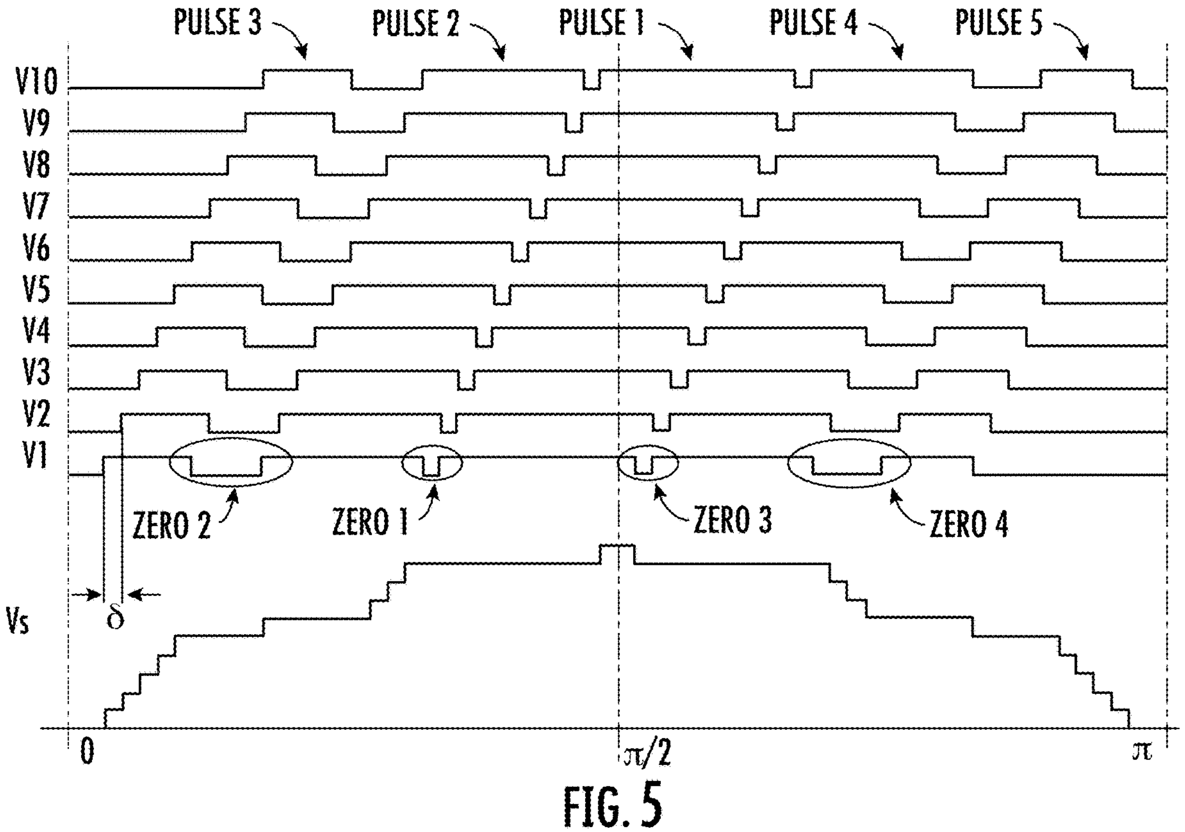
FIG. 5 is waveform diagrams of an output voltage of each cascaded bridge and a total output voltage of the cascaded bridges according to some embodiments of the present inventive concept.

Some embodiments of the present inventive concept provides another staircase modulation method for a power converter. FIG. 5 shows waveform diagrams of an output voltage of each cascaded bridge and a total output voltage of the cascaded bridges according some embodiments of the present inventive concept. Compared with FIG. 4, in this embodiment, four "zero zones" (two "zero zone pairs") Zero1 and Zero3 as well as Zero2 and Zero4 are inserted into each voltage pulse to divide one voltage pulse into five pulses Pulse1~Pulse5 (thus, these embodiments may also be referred to as a "five-pulse embodiment"). An interval between the pulse Pulse1 and the pulse Pulse2 is Zero1, an interval between the pulse Pulse2 and the pulse Pulse3 is Zero2, an interval between the pulse Pulse1 and the pulse Pulse4 is Zero3, and an interval between the pulse Pulse4 and the pulse Pulse5 is Zero4. In this embodiment, the width of the pulse Pulse1 is greater than the width of the pulse Pulse2 on the left side of the pulse Pulse1 and the width of the pulse Pulse4 on the right side of the pulse Pulse1, the width of the pulse Pulse2 is greater than the width of the pulse Pulse3 on the left side of the pulse Pulse2, the width of the pulse Pulse4 is greater than the width of the pulse Pulse5 on the right side of the pulse Pulse4, the width of the pulse Pulse2 is equal to the width of the pulse Pulse4, the width of the pulse Pulse3 is equal to the width of the pulse Pulse5, the width of Zero1 is equal to the width of Zero3, the width of Zero2 is equal to the width of Zero4, and the width of the zero zone Zero1 is greater than the width of the zero zone Zero2. Therefore, an "up stairs" configuration is formed from the pulse Pulse3 to the pulse Pulse2 and then to the pulse Pulse1, a "down stairs" configuration is formed from the pulse Pulse1 to the pulse Pulse4 and then to the pulse Pulse5, and the pulse pair including the pulse Pulse2 and the pulse Pulse4 and the pulse pair including the pulse Pulse3 and the pulse Pulse5 each are symmetrically arranged with respect to the pulse Pulse1, forming a half-wave waveform that is symmetrical about a $\pi/2$ line. In this embodiment, the midpoint of the pulse Pulse1 is used as a symmetric point, and the pulses and zero zones on both sides of the midpoint are symmetrically arranged. In addition, similar to the previous three-pulse embodiment, in particular, the widths and positions (that is, distances between the zero zones and the midpoint of an initial pulse) of the zero zones are calculated based on harmonics to be filtered, and the sum of the five voltage pulses of each cascaded bridge is modulated closer to a sine wave.

In this embodiment, a phase shift $\delta$ of adjacent bridges is further reduced, thereby further reducing imbalance of power allocation in a cascaded system.

Figure 6:
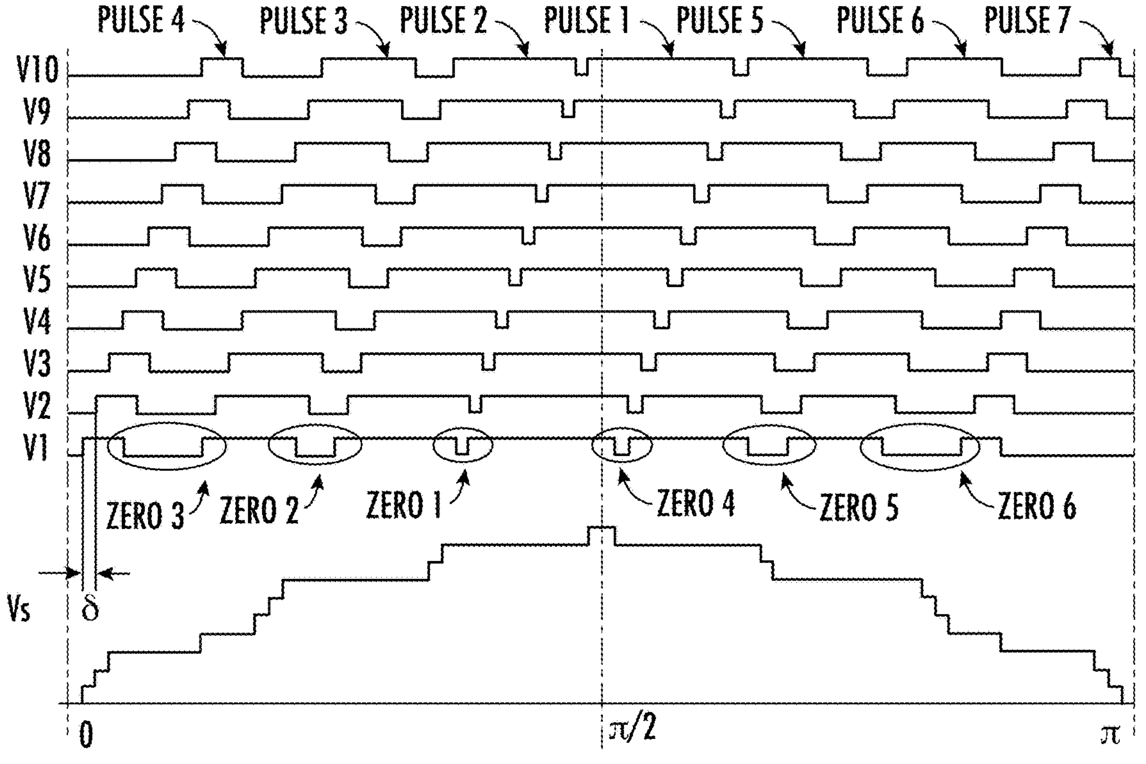
FIG. 6 is waveform diagrams of an output voltage of each cascaded bridge and a total output voltage of the cascaded bridges according to some embodiments of the present inventive concept.

Still further embodiments of the present inventive concept provides still another staircase modulation method for a power converter. FIG. 6 shows waveform diagrams of an output voltage of each cascaded bridge and a total output voltage of the cascaded bridges according to some embodiments of the present inventive concept. Compared with FIG. 5, in this embodiment, two "zero zones" are further added into each voltage pulse, that is, six "zero zones" (three "zero zone pairs") Zero1 and Zero4, Zero2 and Zero5, as well as Zero3 and Zero6 are inserted into each voltage pulse to divide one voltage pulse into seven pulses Pulse1~Pulse7 (thus, these embodiments may also be referred to as a "seven-pulse embodiment"). An interval between the pulse Pulse1 and the pulse Pulse2 is Zero1, an interval between the pulse Pulse2 and the pulse Pulse3 is Zero2, an interval between the pulse Pulse3 and the pulse Pulse4 is Zero3, an interval between the pulse Pulse1 and the pulse Pulse5 is Zero4, an interval between the pulse Pulse5 and the pulse Pulse6 is Zero5, and an interval between the pulse Pulse6 and the pulse Pulse7 is Zero6. In this embodiment, as shown in FIG. 6, on the left side of the pulse Pulse1, the pulse widths from the pulse Pulse4 to the pulse Pulse1 sequentially increase; and on the right side of the pulse Pulse1, the pulse widths from the pulse Pulse1 to the pulse Pulse7 sequentially decrease. Therefore, an "up stairs" configuration is formed from the pulse Pulse4 to the pulse Pulse1, and a "down stairs" configuration is formed from the pulse Pulse1 to the pulse Pulse7. In this embodiment, similarly to the foregoing, the midpoint of the center pulse Pulse1 is used as a symmetric point, and the zero zones and pulses on both sides of the midpoint are symmetrically arranged. In addition, similar to the previous embodiments, in particular, the widths and positions (that is, the distances between the zero zones and the midpoint of the initial pulse) of the zero zones are calculated based on harmonics to be filtered, and the sum of the seven voltage pulses of each cascaded bridge is modulated closer to a sine wave.

In this embodiment, a phase shift $\delta$ of adjacent bridges is further reduced compared with the previous embodiment, thereby further reducing imbalance of power allocation in a cascaded system.

Figure 7:
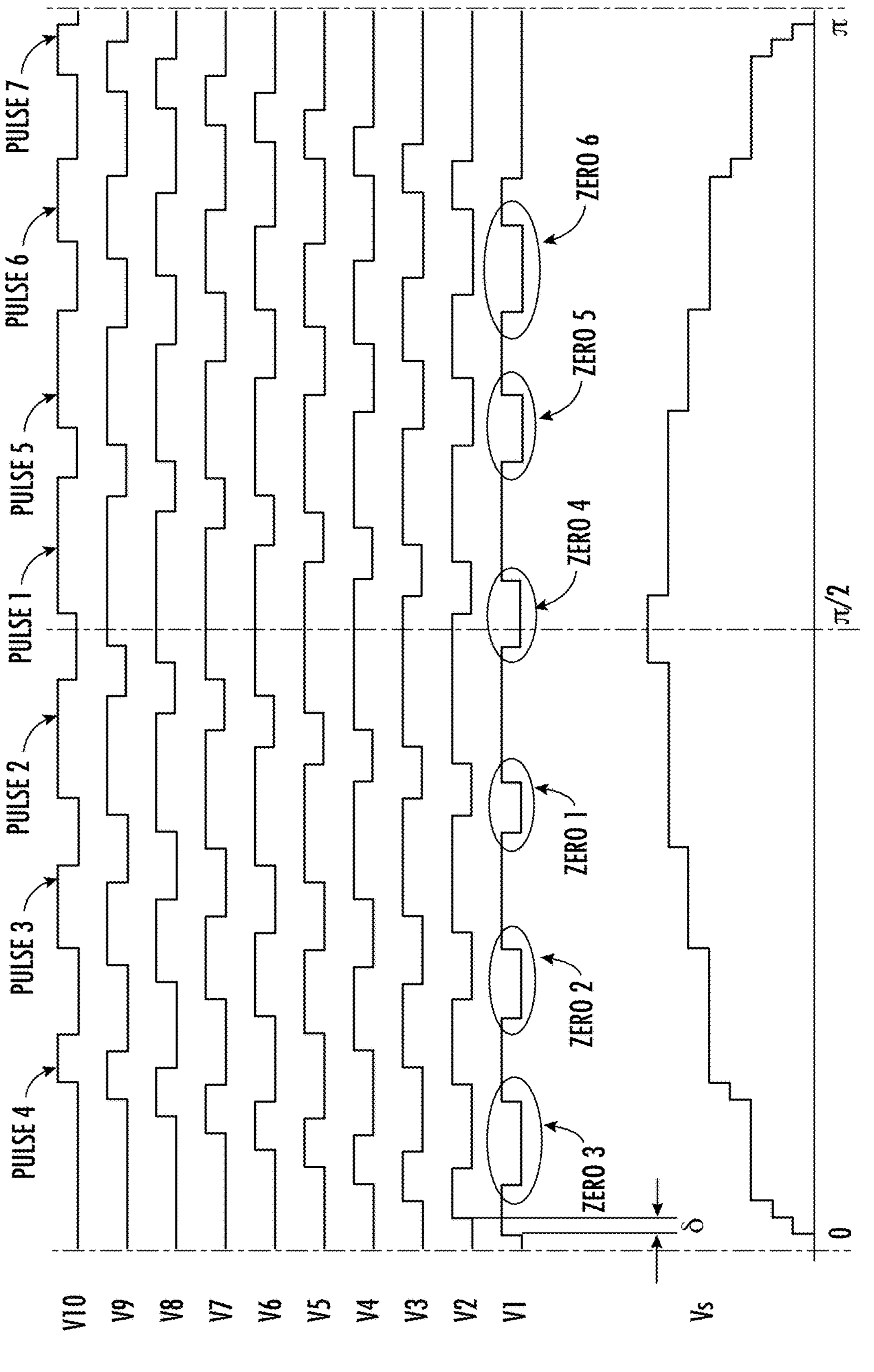
FIG. 7 is waveform diagrams of an output voltage of each cascaded bridge and a total output voltage of the cascaded bridges according to some embodiments of the present inventive concept.

Some embodiments of the present inventive concept further provides a staircase modulation method for a power converter. FIG. 7 shows waveform diagrams of an output voltage of each cascaded bridge and a total output voltage of the cascaded bridges according to another seven-pulse embodiments of the present inventive concept. Compared with the seven-pulse embodiments shown in FIG. 6, in this embodiment, the width of each pulse is reduced and the width of each zero zone is increased while the "up stairs" and "down stairs" configurations are ensured, but the phase shift angle of each bridge remains unchanged. Different modulation indexes can be implemented by changing the width of each pulse and the width of each zero zone. In these embodiments of the present inventive concept, the modulation index refers to an amplitude of a sine wave that needs to be equivalent to pulses (0 means there is no sine voltage~1 means a maximum sine voltage). As the modulation index increases, the pulse width typically increases as well. The pulse width is determined according to a volt-second balance principle.

In the foregoing embodiments of the present inventive concept, numbers of pulses and zero zones respectively start from a center pulse and center zero zones and increase outward on both sides. FIG. 6 is used as an example. The center pulse is numbered as Pulse1, the pulses are sequentially numbered as Pulse2, Pulse3, and Pulse4 from Pulse1 to the left, and the pulses are sequentially numbered as Pulse5, Pulse6, and Pulse7 from Pulse1 to the right. Similarly, two zero zones in the center are respectively numbered as Zero1 and Zero4, the zero zones are sequentially numbered as Zero2 and Zero3 from Zero1 to the left, and the zero zones are sequentially numbered as Zero5 and Zero6 from Zero4 to the right. Those skilled in the art can understand that a numbering manner of increasing from left to right in sequence or decreasing from left to right in sequence may also be used, and numbering rules of the pulses and the zero zones do not affect the modulation method in the present inventive concept. FIG. 6 is still used as an example. Seven pulses may be sequentially numbered as Pulse1, Pulse2, . . . , and Pulse7 from left to right, and six zero zones are sequentially numbered as Zero1, Zero2, . . . , and Zero6 from left to right, or vice versa.

Figure 8:
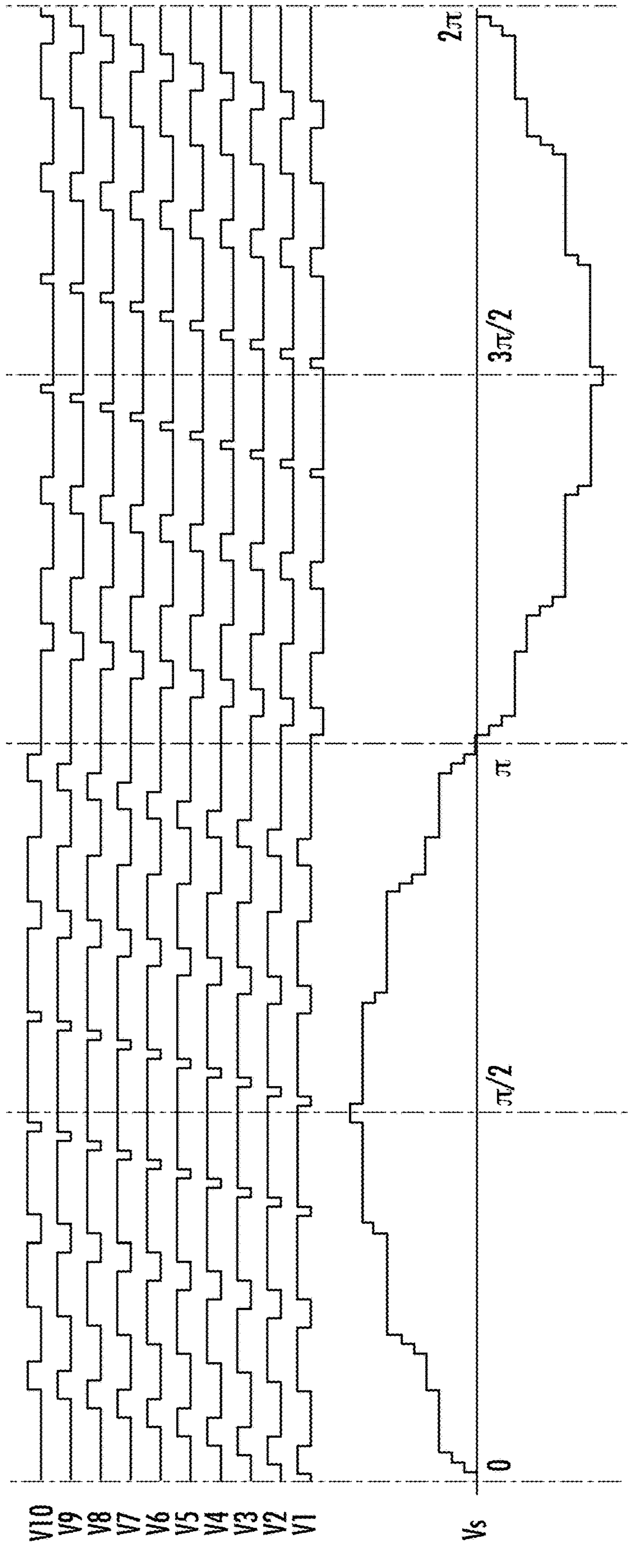
FIG. 8 is waveform diagrams of an output voltage of each cascaded bridge and a total output voltage of the cascaded bridges in one cycle (0~2π) according some embodiments of the present inventive concept.

In the foregoing embodiments, only a case in a half cycle ($0\sim\pi$) is discussed. Those skilled in the art can understand that, for the foregoing case of three levels of voltages (+V, 0, −V), widths and intervals of all pulses in the other half cycle ($\pi\sim2\pi$) are the same as those in the $0\sim\pi$, but are inverted in phase. FIG. 8 shows waveform diagrams of an output voltage of each cascaded bridge and a total output voltage of the cascaded bridges in one cycle (0~2π) according to a seven-pulse embodiment.

Some embodiments of the present inventive concept, each bridge generates two levels of voltages (+V, 0) on its alternating current side, and a staircase modulation method similar to the foregoing is used, which is equivalent to repeating a case in a positive half cycle in the foregoing embodiment, and an output voltage of the power converter is a positive "steamed bread wave".

According to some embodiments of the present inventive concept, each bridge generates two levels of voltages (0, −V) on its alternating current side, and a staircase modulation method similar to the foregoing is used, which is equivalent to repeating a case in a negative half cycle in the foregoing embodiment, and an output voltage of the power converter is a negative "steamed bread wave".

According to other embodiments of the present inventive concept, voltages generated by each bridge on its alternating current side are not limited to two levels and three levels, and may be more than three levels.

In the foregoing embodiments, only 10 cascaded bridges are used as an example for discussion. In other embodiments, the quantity of the cascaded bridges is not limited to 10, provided that the quantity is greater than or equal to 2.

In addition, in the embodiments of the present inventive concept, the quantity of pulses included in the output voltage of each cascaded bridge is not limited to 7, and may be 9, 11, . . . , or (2k+1), where k is an integer and k≥1.

The multilevel power converter in the present inventive concept is based on a new staircase modulation method, and has low power imbalance, reduced harmonics, low switching losses, and good dynamic performance.

Although the present inventive concept has been described by using preferred embodiments, the present inventive concept is not limited to the embodiments described herein, and includes various changes and variations without departing from the scope of the present inventive concept.

What is claimed is:

1. A power converter, comprising n cascaded bridges, wherein n≥2, the n cascaded bridges are each configured to output same multilevel pulses, the output n multilevel pulses are sequentially phase-shifted by a same angle, and the n multilevel pulses are superimposed on each other to form a desired output pulse waveform of the power converter;

wherein each of the n cascaded bridges is configured such that an output pulse of each cascaded bridge comprises 2k+1 sub-pulses in each half cycle, wherein k≥1;

wherein the 2k+1 sub-pulses are symmetrically distributed by using a $(k+1)^{th}$ sub-pulse as a center, pulse widths from a $1^{st}$ sub-pulse to the $(k+1)^{th}$ sub-pulse sequentially increase, and pulse widths from the $(k+1)^{th}$ sub-pulse to a $(2k+1)^{th}$ sub-pulse sequentially decrease; and wherein the 2k+1 sub-pulses are spaced by 2k zero zones.

2. The power converter of claim 1, wherein the multilevel pulses are 2-level pulses or 3-level pulses.

3. The power converter of claim 2, wherein the 2k zero zones are symmetrically distributed by using the $(k+1)^{th}$ sub-pulse as a center.

4. The power converter of claim 3, wherein widths from a $1^{st}$ zero zone to a $k^{th}$ zero zone sequentially decrease, and widths from a $(k+1)^{th}$ zero zone to a $2k^{th}$ zero zone sequentially increase.

5. The power converter of claim 1, wherein a minimum value of the same angle is 1/n of the pulse width of the $1^{st}$ sub-pulse.

6. The power converter of claim 1, wherein n=10.

7. The power converter of claim 1, wherein k=1, 2, or 3.

8. A staircase modulation method for a power converter, wherein the power converter comprises n cascaded bridges, n≥2, and the staircase modulation method comprises:

adjusting the n cascaded bridges such that the n cascaded bridges each output same multilevel pulses and the output n multilevel pulses are sequentially phase-shifted by a same angle, and superimposing the n multilevel pulses on each other to form a desired output pulse waveform of the power converter, wherein each of the n cascaded bridges is adjusted such that an output pulse of each cascaded bridge comprises 2k+1 sub-pulses in each half cycle, wherein k≥1;

wherein the 2k+1 sub-pulses are symmetrically distributed by using a $(k+1)^{th}$ sub-pulse as a center, pulse widths from a $1^{st}$ sub-pulse to the $(k+1)^{th}$ sub-pulse sequentially increase, and pulse widths from the $(k+1)^{th}$ sub-pulse to a $(2k+1)^{th}$ sub-pulse sequentially decrease; and wherein each of the n cascaded bridges is further adjusted such that the 2k+1 sub-pulses are spaced by 2k zero zones.

9. The staircase modulation method of claim 8, wherein the n cascaded bridges are adjusted such that the n cascaded bridges each output 2-level pulses or 3-level pulses.

10. The staircase modulation method of claim 9, wherein the 2k zero zones are symmetrically distributed by using the $(k+1)^{th}$ sub-pulse as a center.

* * * * *